(12) United States Patent
Maruyama

(10) Patent No.: US 7,016,057 B1
(45) Date of Patent: Mar. 21, 2006

(54) ELECTRONIC MAIL TRANSMITTING APPARATUS HAVING A PRINTER DRIVER FOR TRANSMITTING ELECTRONIC MAIL AND METHOD FOR TRANSMITTING ELECTRONIC MAIL BY A PRINTER DRIVER

(75) Inventor: Akeo Maruyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/398,038

(22) Filed: Sep. 17, 1999

(30) Foreign Application Priority Data

| Sep. 18, 1998 | (JP) | ................................ 10-283459 |
| Sep. 10, 1999 | (JP) | ................................ 11-257777 |

(51) Int. Cl.
*G06F 15/00* (2006.01)
*G06F 15/16* (2006.01)

(52) U.S. Cl. .................... 358/1.15; 358/1.15; 358/402; 709/206; 709/213

(58) Field of Classification Search ............... 358/1.15, 358/402, 442, 1.13; 709/206, 203, 223, 213; 379/201.05
See application file for complete search history.

(56) References Cited

U.S. PATENT DOCUMENTS

| 4,941,170 | A | * | 7/1990 | Herbst ........................ 379/100 |
| 5,958,005 | A | * | 9/1999 | Thorne et al. .............. 709/202 |
| 5,978,846 | A | * | 11/1999 | Kimishima ................. 709/227 |
| 6,128,646 | A | * | 10/2000 | Miloslavsky ................ 709/206 |
| 6,181,440 | B1 | * | 1/2001 | Masuda ...................... 358/434 |
| 6,310,694 | B1 | * | 10/2001 | Okimoto et al. ........... 358/1.15 |
| 6,449,055 | B1 | * | 9/2002 | Okimoto et al. ........... 358/1.15 |

FOREIGN PATENT DOCUMENTS

JP          8-307702           11/1996

\* cited by examiner

*Primary Examiner*—Kimberly Williams
*Assistant Examiner*—Saeid Ebrahimi-Dehkordy
(74) *Attorney, Agent, or Firm*—Oblon, Spivak, McClelland, Maier & Neustadt, P.C.

(57) ABSTRACT

An electronic mail transmitting apparatus can transmit a document via electronic mail by a simple operation. The document is prepared by a specific application such as a word processor application and an instruction for the electronic mail transmission is input through the specific application. The specific application preparing document data has a function to send a print instruction to print the document data. A printer driver is activated by the print instruction of the application program. The printer driver converts the document data provided by the specific application into a predetermined data format and transmits the converted document data via electronic mail.

15 Claims, 8 Drawing Sheets

ELECTRONIC MAIL TRANSMITTING APPARATUS HAVING A PRINTER DRIVER FOR TRANSMITTING ELECTRONIC MAIL AND METHOD FOR TRANSMITTING ELECTRONIC MAIL BY A PRINTER DRIVER

BACKGROUND OF THE INVENTION

1. Field of the Invention

The present invention generally relates to an electronic mail transmitting apparatus for transmitting document data prepared by an application program via electronic mail and, more particularly, to an electronic mail transmitting apparatus which transmits document data prepared by a specific application program such as a word processor program or an editor program via electronic mail with a simple operation similar to that performed for designating a printing operation. The present invention also relates to a computer readable recording medium which stores a program causing a computer to perform a printer driver function having an electronic mail transmitting function.

2. Description of the Related Art

When a document prepared by a specific application program (hereinafter referred to as an application) such as a word processor program is transmitted via electronic mail, the document can be transmitted as a text of an electric mail. Alternatively, the document is encoded so as to produce an attachment file so that the attachment file can be attached to the electronic mail.

When the document prepared by the specific application is attached to electronic mail as an attachment file, the receiver side must have the specific application that prepared the document so as to display or print the document on the receiver side. However, in order to display or print the document on the receiver side which does not have the specific application that prepared the document, the document is attached to an electric mail after converting the document data into a general document reader software format such as a portable document format (PDF).

The conversion of the document data format can be done by an independent application exclusive for converting the document data into the general document reader software format. However, in general, a conversion function provided in a printer driver is used. According to the conversion function of the printer driver, document data can be converted into a data format that can be processed by a printer application.

The above-mentioned electronic mail transmission of a document prepared by a specific application is performed according to the following procedure.

First, as shown in FIG. 1, a document A stored as a file 1d is retrieved by a specific application such as a word processor application for preparing a document, and an instruction is made to print the document A. Then, a printer driver 4 is started up, and the document A is converted into a document reader software format by a conversion function of the printer driver 4. The thus-converted document A is stored as a converted file 1e. Thereafter, as shown in FIG. 2, an electronic mail application 5 is started, and an instruction is made to prepare an electric mail. Then, an E-mail address and a text of the electronic mail are input. After that, the stored file 1e is attached to the electronic mail, and the electronic mail is transmitted to a computer network 3.

Additionally, when a facsimile modem is connected to a personal computer (hereinafter referred to as a PC) so as to perform facsimile transmission by the PC, a method in which a document prepared by an application is transmitted by facsimile via a printer driver may be used. The printer driver having such a facsimile function may be provided with an address-book function for designating an address and a function for attaching a facsimile cover letter. Japanese Laid-Open Patent Application No. 8-307702 discloses such a printer driver.

As mentioned above, in order to transmit via electric mail a document prepared by a specific application such as a word processor application after converting the document into a data format that can be processed on a receiver side, an application (a printer driver or an application exclusive for conversion) different from the specific application which prepares the document is needed so as to convert the data format of the document. Additionally, an electronic mail application must be started each time an electronic mail is transmitted, and an operation for attaching the converted document to an electronic mail must be performed by a user. Such an operation for converting the document and an operation for preparing the attachment file are annoying work for the user.

SUMMARY OF THE INVENTION

It is a general object of the present invention to provide an improved and useful electronic mail transmitting apparatus and method in which the above-mentioned problems are eliminated.

A more specific object of the present invention is to provide an electronic mail transmitting apparatus and method which can transmit a document via electronic mail by a simple operation for a user, the document being prepared by a specific application such as a word processor application and an instruction for the electronic mail transmission being input through the specific application.

In order to achieve the above-mentioned objects, there is provided according to one aspect of the present invention an electronic mail transmitting apparatus for transmitting document data via electronic mail, the electronic mail transmitting apparatus comprising:

an application program for preparing document data, the application program having a function to send a print instruction to print the document data; and a printer driver activated by the print instruction of the application program, the printer driver having a function to convert the document data provided by the application program into a predetermined data format and a function to transmit the converted document data via electronic mail.

According to the above-mentioned invention, the document data can be transmitted via electronic mail in a manner similar to a manner of a case in which the document data is printed out in accordance with the print instruction sent from the application program. Accordingly, there is no need to perform an annoying operation such as an operation for converting the document data by using an application different from the application which prepared the document data or an operation for attaching the converted document data to an electronic mail. Thus, the document data prepared by the application program can be transmitted via electronic mail by a simple operation.

In the electronic mail transmitting apparatus according to the present invention, the printer driver may transmit the converted document data by attaching to an electronic mail as an attachment file.

Additionally, in the electronic mail transmitting apparatus according to the present invention, the predetermined data format may be one of a bit map image format, a document reader software format, a text format, a page description language (PDL) format, a hyper text markup language (HTML) format and a standard generalized markup language (SGML) format.

Further, in the electronic mail transmitting apparatus according to the present invention, the printer driver may have a function to manage information regarding electronic mail addresses. The printer driver may also have a function to edit a text of an electronic mail to be transmitted.

Additionally, there is provided according to another aspect of the present invention a method for transmitting document data prepared by an application program via electronic mail, the method comprising the steps of:

transferring the document data to a printer driver by sending from the application program a print instruction for printing the document data;

converting the document data into a predetermined data format by the printer driver; and transmitting the converted document data via electronic mail by an electronic mail transmitting function provided to the printer driver.

According to the above-mentioned method, the document data can be transmitted via electronic mail in a manner similar to a manner of a case in which the document data is printed out in accordance with the print instruction sent from the application program. Accordingly, there is no need to perform an annoying operation such as an operation for converting the document data by using an application different from the application which prepared the document data or an operation for attaching the converted document data to an electronic mail. Thus, the document data prepared by the application program can be transmitted via electronic mail by a simple operation.

Additionally, there is provided according to another aspect of the present invention a processor readable medium storing program code for causing a computer to perform a function of the above-mentioned printer driver.

Other objects, features and advantages of the present invention will become more apparent from the following detailed description when read in conjunction with the accompanying drawings.

DETAILED DESCRIPTION OF THE PREFERRED EMBODIMENT

Figure 1:
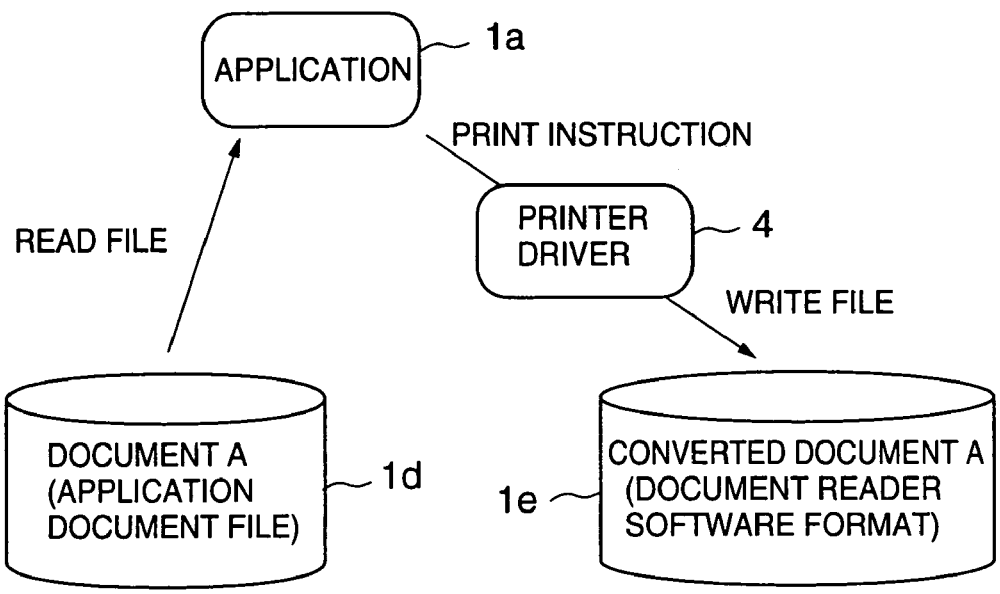
FIG. 1 is an illustration of a structure of a conventional print system.
Figure 2:
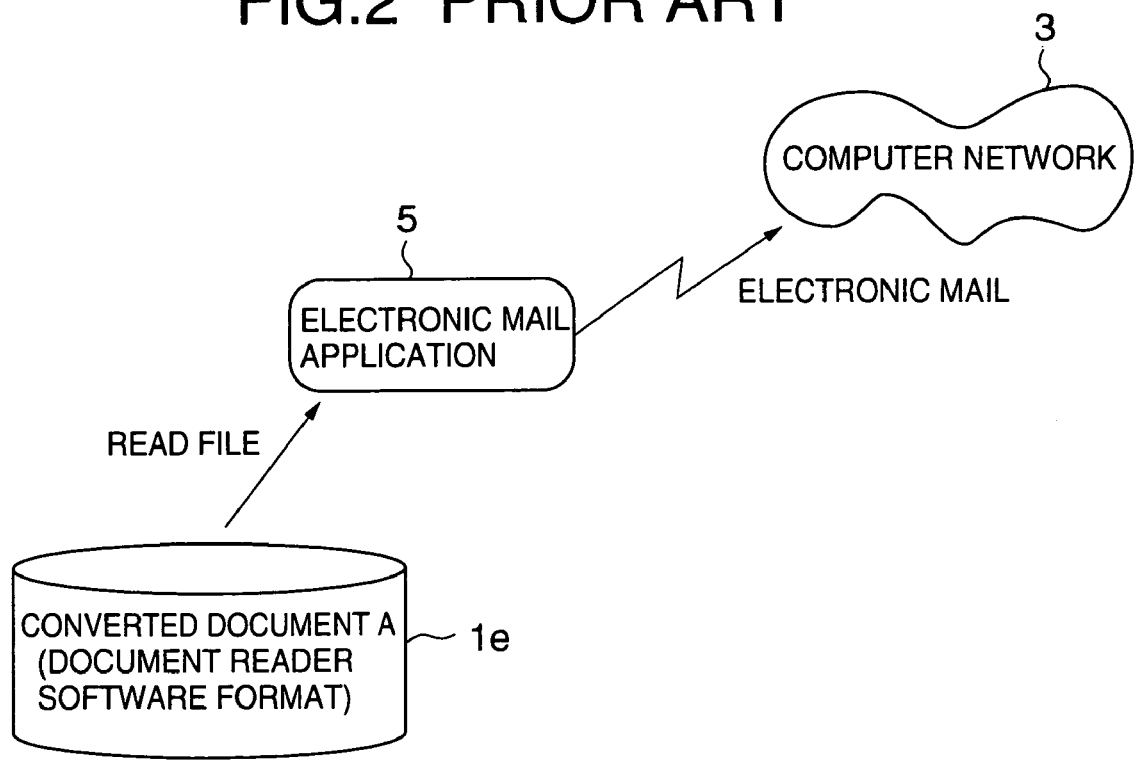
FIG. 2 is an illustration for explaining an electronic mail transmitting operation by a conventional electronic mail application.
Figure 3:
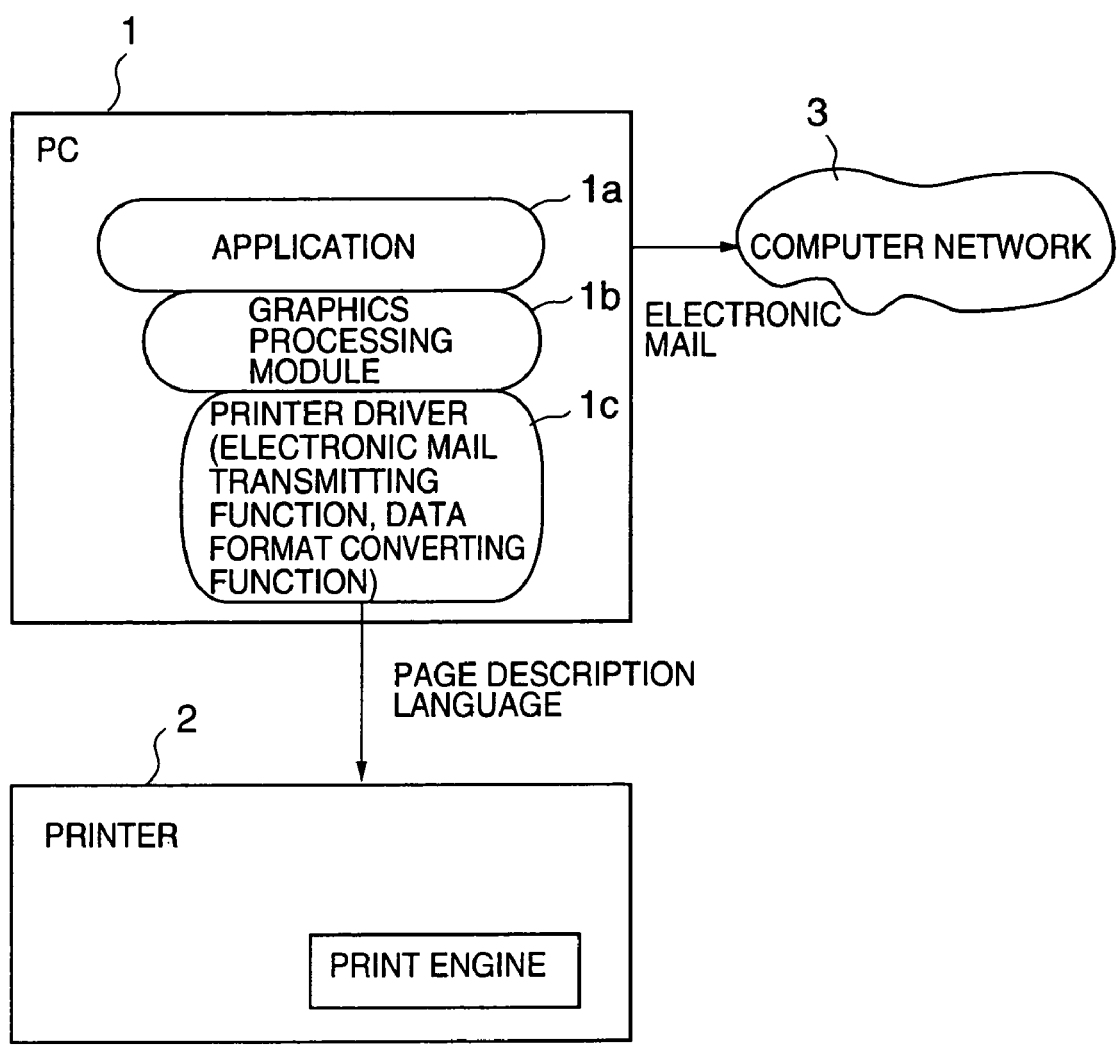
FIG. 3 is a structural diagram of an electronic mail transmitting system according to an embodiment of the present invention.
Figure 4:
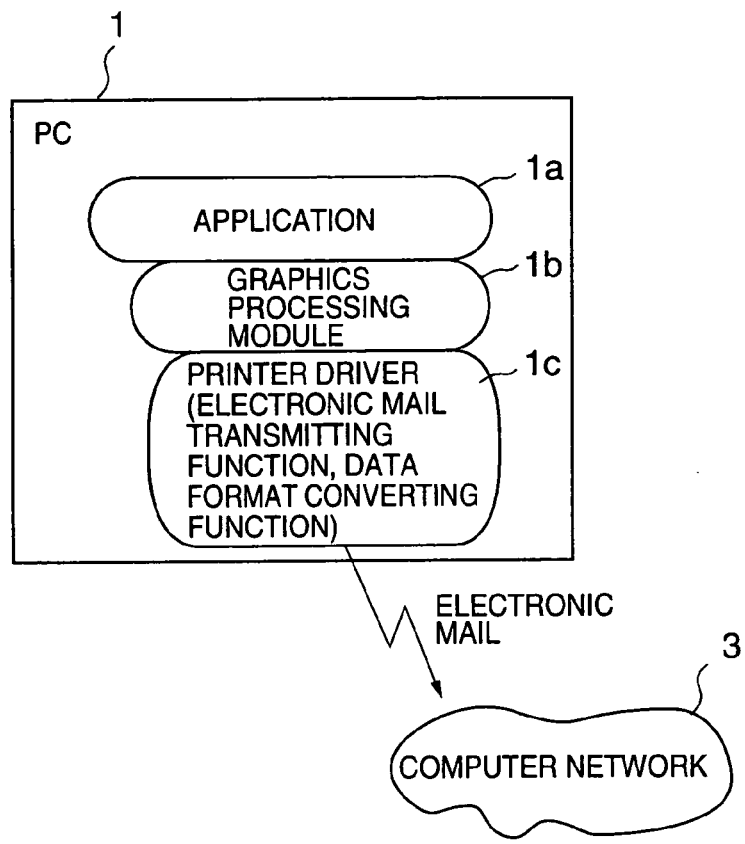
FIG. 4 is an illustration showing an electronic mail transmitting operation performed by a personal computer shown in FIG. 3.

A description will now be given, with reference to FIGS. 3, 4 and 5, of a first embodiment of the present invention. FIG. 3 shows a structure of an electronic mail transmitting system according to the first embodiment of the present invention. As shown in FIG. 3, in the electronic mail transmitting system according to the present embodiment, a personal computer (PC) 1 and a printer 2 are connected to each other so that bidirectional communication can be performed therebetween. The PC 1 is connected to a computer network 3 so that the PC 1 can send an electronic mail to a remote computer via the computer network 3.

A specific application 1a such as a word processor application, a graphics processing module 1b and a printer driver 1c are installed to the PC 1. The graphics processing module 1b constitutes a part of an operating system (OS) of the PC 1.

A description will now be given, with reference to FIGS. 3, 4 and 5, of a process for sending an electronic mail by the application 1a such as a word processor application in the electronic mail transmission system according to the present embodiment in which the OS is operating on the PC 1.

When a document prepared by the application 1a is printed by the printer 2, the printer driver 1c is started by a print instruction sent from the application via the graphics processing module 1b. Then, the document data designated for printing by the application 1a is converted into a page description language (PDL) format. The converted document data is provided from the PC 1 to the printer 2, and a printing operation is performed by the printer 2. The page description language format is a data format which can be processed by the printer 2. That is, the printer 2 is capable of printing an image representing the contents of the document data of the page description language format.

As mentioned above, a regular printing operation is performed in the same manner as the conventional printing operation. Additionally, in the present embodiment, when the document data prepared by the application 1a is sent via electric mail, an instruction for sending an electronic mail is sent from the application 1a, as shown in FIG. 4, in the same manner as the printing operation. Then, the document data is converted into a specific data format by a data format converting function of the printer driver 1c so that the converted document data can be displayed and printed on a remote terminal receiving the electronic mail. Thereafter, the electronic mail is transmitted by an electronic mail transmitting function provided in the printer driver 1c. The converted document data is incorporated in the electronic mail as a text of the electronic mail or an attachment file.

Figure 5:
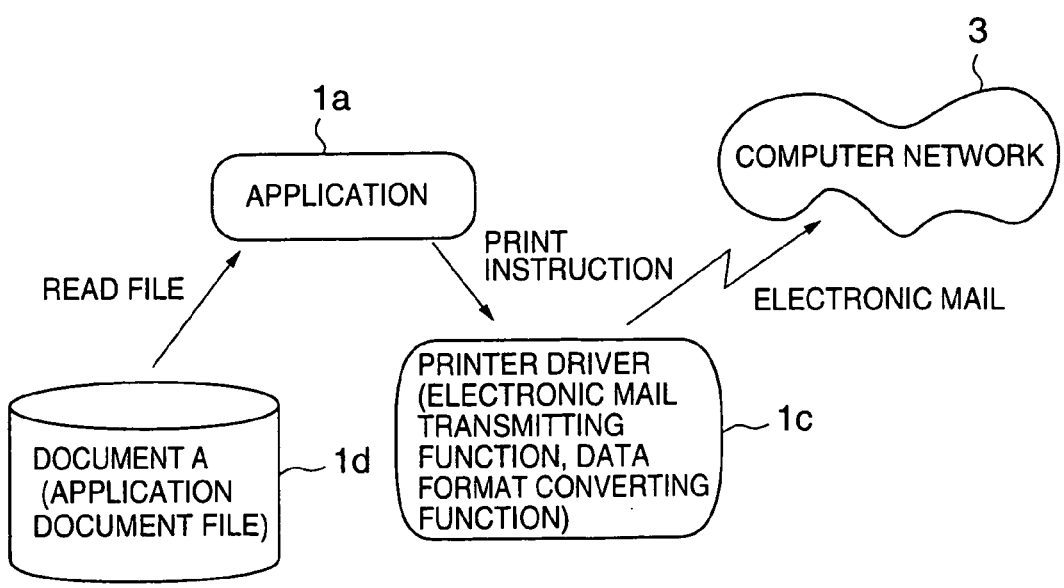
FIG. 5 is an illustration for explaining the electronic mail transmitting operation performed by the personal computer shown in FIG. 3.

When an electronic mail is sent by the application 1a, as shown in FIG. 5, document data A stored in an application document file 1d is retrieved by the application 1a, and the application 1a sends a print instruction for the document data A. Then, the printer driver 1c is started, and the retrieved document data A is converted into data having the specific data format by the data format converting function of the printer driver 1c so that the data having the specific data format can be displayed and printed on a remote terminal receiving the electronic mail. Thereafter, the converted document data A is transmitted to the computer network 3 as an attachment file of the electric mail. The specific data format of the converted document data A may vary according to an electronic mail application of the receiver, a specification of a binary data processing method on the computer network 3 or a characteristic of data after conversion. In the present embodiment, the specific data format is the same as a data format that is used in a case in which data to be transmitted is encoded to data represented by only text by a conventional electronic mail application and the encoded data is transmitted as an attachment file of an electronic mail.

As mentioned above, in the present embodiment, the document data A can be transmitted via electronic mail in a manner similar to a manner of a case in which the document data A is printed out in accordance with the print instruction sent from the application 1a. Accordingly, there is no need to perform annoying operations such as converting the document data A by using an application different from the application 1a which prepared the document data A or attaching the converted document data A to an electronic mail. Thus, the document data prepared by the application 1a can be transmitted via electronic mail by a simple operation.

In the above-mentioned embodiment, a bit-map image format may be used as the specific data format so as to transmit the converted document data A via electronic mail and display or print the converted document data A on the receiver side. That is, the document prepared by the application 1a is developed in a bit-map image by the printer driver 1c, and the developed bit-map image is converted into a bit-map image format which can be developed on the receiver side. Then, the converted bit-map image data is transmitted via electronic mail by being attached as an image file. Accordingly, the image file attached to the electronic mail can be displayed on a monitor or printed by a printer on the receiver side by developing the image file on a bit-map.

A series of processes for attaching the bit-map image file is similar to processes performed by a facsimile modem for transmitting a document prepared by an application. However, the transmission of the developed image in the present embodiment is different from that of the facsimile transmission in that the present embodiment uses electronic mail while the facsimile modem uses facsimile transmission.

Additionally, a document reader software format used by a generally used document reader software such as the Acrobat Reader™ may be used as the specific data format so as to transmit the converted document data A via electronic mail and display or print the converted document data A on the receiver side. The Acrobat Reader™ is an application for reading a portable document format (PDF) file. That is, the document data prepared by the application 1a is converted into the document reader software format by the printer driver 1c, and the thus-converted document data is transmitted as an attachment file via electronic mail. Thereby, the attachment file attached to the electronic mail can be processed by the document reader software on the receiver side. Although a process is dependent on the document reader software provided to the receiver side, generally the attachment file can be displayed and edited by the document reader software and printed by the printer.

Additionally, a text format may be used as the specific data format so as to transmit the converted document data A via electronic mail and display or print the converted document data A on the receiver side. That is, the document data prepared by the application 1a is converted into the text format by the printer driver 1c, and the thus-converted document data is transmitted as an attachment file via electronic mail. In such a case, the text data corresponding to the converted document data can be added to a text of the electronic mail or attached to the electronic mail as an attachment file.

On the receiver side, the text of the electronic mail or the text file attached to the electronic mail can be displayed, printed or edited by an electronic mail software or an editor software.

Since the converted document data contains only text format data, there may be a case in which a part of the document prepared by the application 1a cannot be converted. However, since the converted data contains only text format data, it is assured that the entire converted data can be processed by a different application. Additionally, transmission of an electronic mail using text format data can be performed by a word processor application that is usually used by a user without using electronic mail software.

Further, a page description language (PDL) format may be used as the specific data format so as to transmit the converted document data A via electronic mail and display or print the converted document data A on the receiver side. That is, the document data prepared by the application 1a is converted into the page description language format by the printer driver 1c, and the thus-converted document data is transmitted via electronic mail. In such a case, the converting process is similar to the process performed by the printer driver when printing. The page description language format data can be added to a text of the electronic mail or attached to the electronic mail as an attachment file. On the receiver side, the page description language format data can be output by a printer that can read the page description language format data.

Additionally, an electronic document format such as a hyper text markup language format (HTML) format or a standard generalized markup language (SGML) format may be used as the specific data format so as to transmit the converted document data A via electronic mail and display or print the converted document data A on the receiver side. That is, the document data prepared by the application 1a is converted into the HTML format or the SGML format by the printer driver 1c, and the thus-converted document data is transmitted via electronic mail. The HTML format data or the SGML format data can be added to a text of the electronic mail or attached to the electronic mail as an attachment file. On the receiver side, the HTML format data or the SGML format data can be displayed, printed or edited by electronic mail software or Web browser.

In the above-mentioned embodiment, when the printer driver 1c is started, an input operation window of the printer driver 1c is displayed on a display unit of the PC 1. An electronic mail address should be input through the input operation window. Accordingly, an information managing function (address-book function) for managing information regarding electronic mail addresses is provided to the printer driver so that a user can input a desired electronic mail address by selecting the address from among electronic mail addresses managed by the printer driver 1c through the operation window. For example, a plurality of previously registered electronic mail addresses are displayed on the input operation window so that the user can designate one of the displayed electronic mail addresses on the input operation screen.

Additionally, an editing function may be provided to the print driver 1c so as to edit a text of the electronic mail including the converted document data. That is, additional information such as a comment to the document can be included in the same electronic mail. In order to achieve such a function, a template corresponding to a letter head of an electronic mail may be provided so that the user can select the template so as to input or edit information regarding a description or memo of the document to be transmitted by the electronic mail. Such a description or memo is transmitted as a text of the electronic mail together with the converted document data which is attached as an attachment file to the electronic mail.

The printer driver 1c can be installed to an electronic apparatus such as document preparing apparatus having an electronic mail transmitting function or a personal computer having an electronic mail application and a word processor application. According to an electronic apparatus in which the printer driver is installed, a document prepared by the word processor application can be transmitted via electronic mail in the same manner as a printing operation for printing the prepared document by the word processor application.

Figure 13:
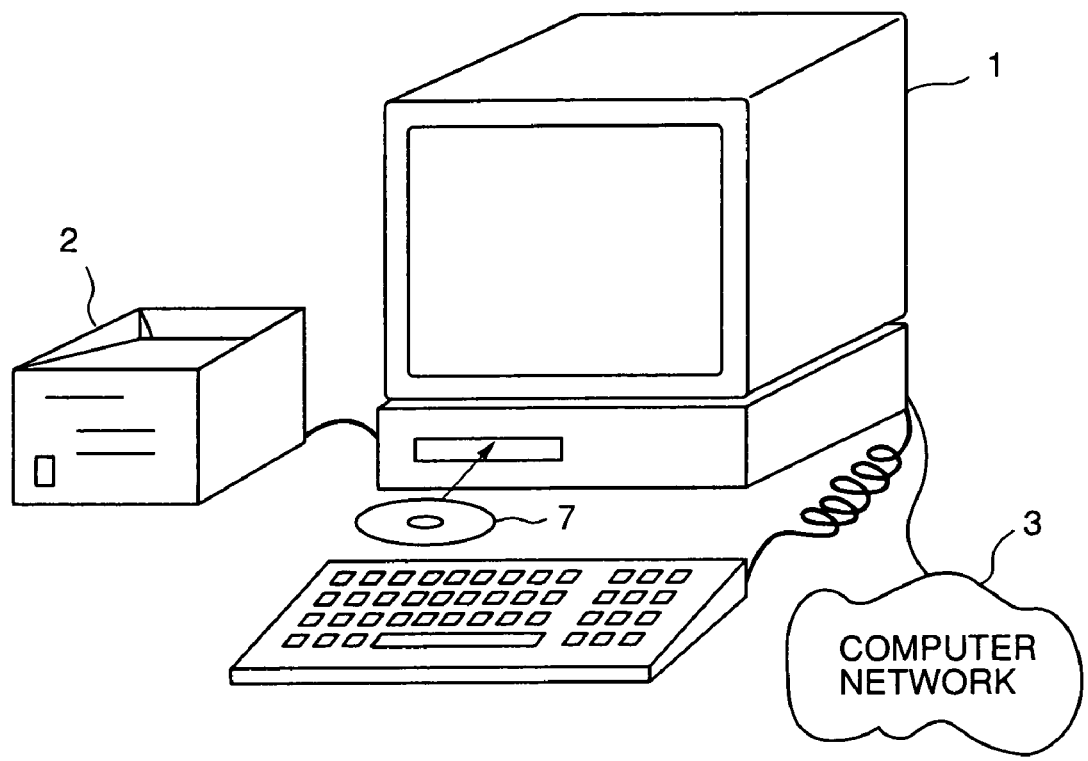
FIG. 13 is a perspective view of a personal computer that is configured to execute software stored on a processor readable medium.

As shown in FIG. 13, the printer driver 1c may be stored in a recording medium such as a CD-ROM 7 so that the printer driver 1c can be installed to an electronic apparatus such as the personal computer 1 from the CD-ROM 7. The recording medium may be in other forms such as a floppy disk (FD), a magnetooptical disk (MO) or a mini-disk (MD). Such an electronic apparatus in which the printer driver 1c is installed can perform the same electronic mail function as the PC 1 according to the above-mentioned embodiment of the present invention. Additionally, by installing the printer driver 1c stored in a recording medium to a plurality of personal computers via a network, a communication system having a plurality of terminals provided with the above-mentioned electronic mail function according to the present invention can be constructed.

Figure 6:
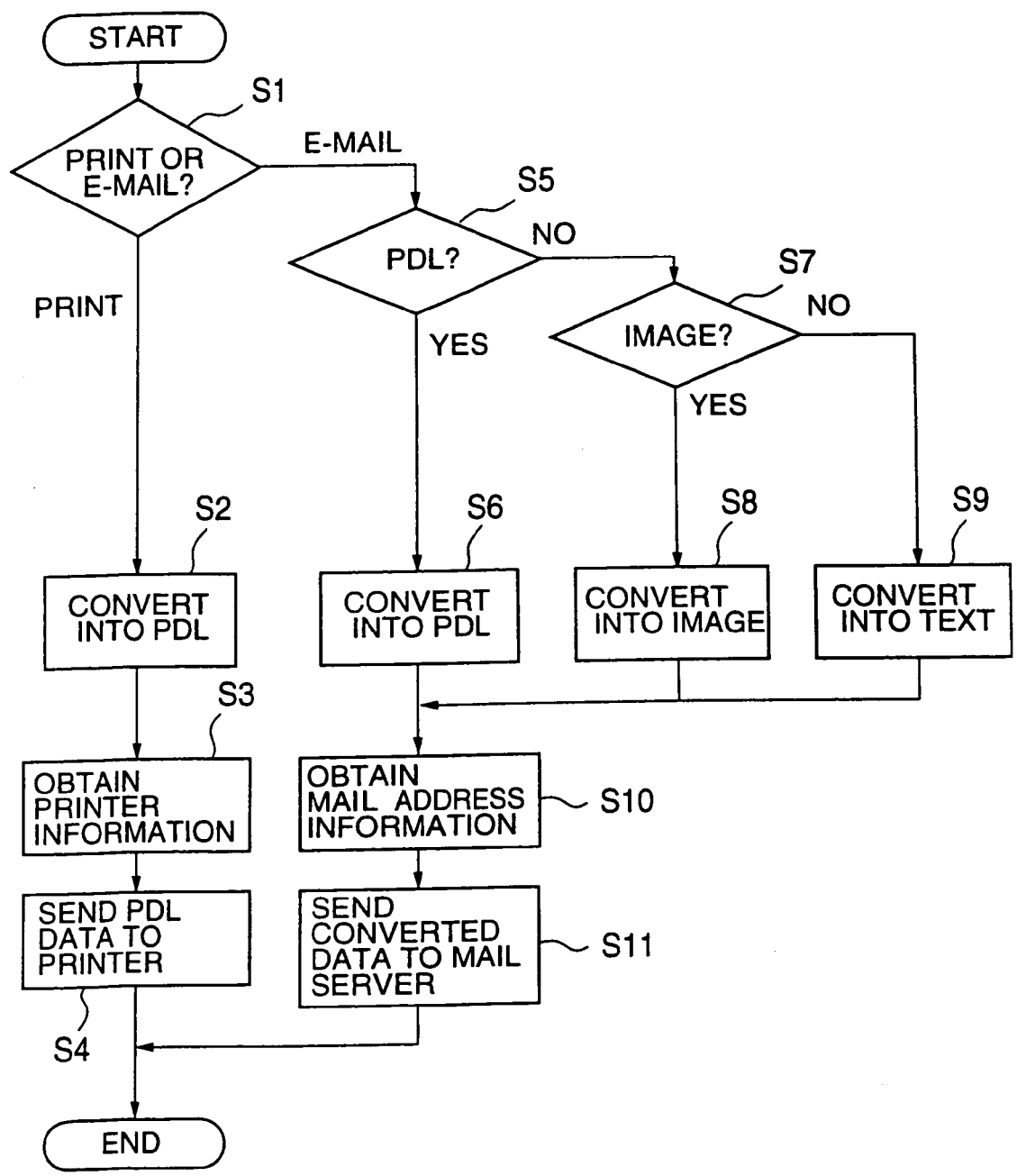
FIG. 6 is a flowchart of an operation performed by a printer driver shown in FIG. 3.

A description will now be given, with reference to FIG. 6, of an operation of the printer driver 1c according to the above-mentioned embodiment of the present invention. FIG. 6 is a flowchart of an operation of the printer driver 1c. It is assumed that the printer driver 1c is provided with a function to convert document data into a page description language (PDL) format, a function to convert document data into an image data format and a function to convert document data into a text format.

When a print instruction for the document data is sent from the application 1a, the printer driver 1c is activated or started. This process is the same as the conventional print instruction. That is, the printer driver 1c has an interface with the OS of PC which interface is the same as that of a conventional printer driver. Accordingly, the user inputs a print instruction through the application even when the user intends to transmit the document data via electronic mail.

When the operation of the printer driver is started, it is determined, in step S1, whether or not the document data which is designated for printing is designated for regular printing or electronic mail transmission. That is, when the printer driver 1c is activated or started, a print dialogue window is displayed on a display unit of the PC 1. When the user elect a property of the print dialogue, a user interface screen (a printing method designating screen) is displayed as shown in FIG. 7.

Figure 7:
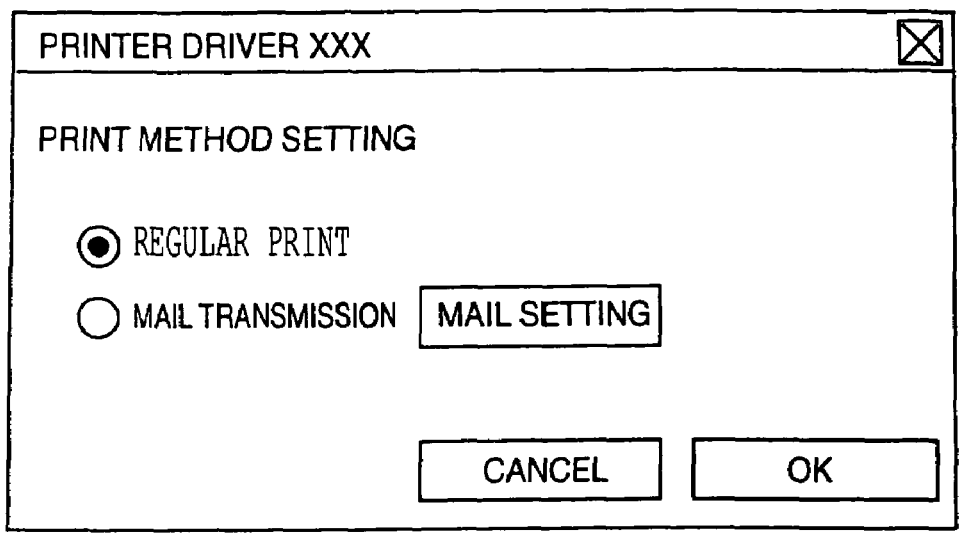
FIG. 7 is an illustration of a printing method designating screen presented by the printer driver shown in FIG. 3.

When the user intends to print the document data by the regular printing, the user designate the regular print on the screen shown in FIG. 7 and click an OK button. Then, the print dialogue window appears again and the regular printing operation is performed. That is, if it is determined, in step S1, that the regular printing operation is designated, the routine proceeds to step S2. In step S2, the document data provided by the application 1a is converted into the page description language format. Then, in step S3, information regarding a printer to be used for printing is obtained. Thereafter, in step S4, the document data which was converted into the page description language format is sent to the printer 2, and the routine is ended. Accordingly, the document data is printed out by the printer 2.

As mentioned above, the printer driver 1c has a function as a conventional printer driver, and the interface with the OS installed in the PC 1 is the same as that of a conventional printer driver.

Figure 8:
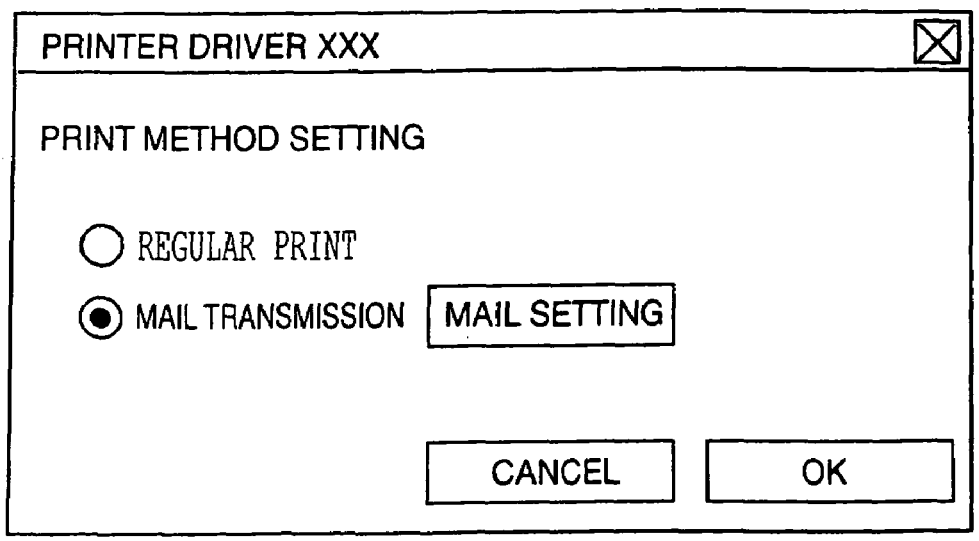
FIG. 8 is an illustration of the printing method designating screen presented by the printer driver shown in FIG. 3.

A description will now be given of an operation of transmitting the document data by the printer driver 1c. If it is determined, in step S1 of FIG. 6, that the mail transmission is designated, the routine proceeds to step S5. That is, in the user interface screen shown in FIG. 7, if the user designates the mail transmission and clicks the OK button as shown in FIG. 8, it is determined that the mail transmission is designated.

In step S5, it is determined whether or not the document data is to be converted into the page description language format. If it is determined that the document data is to be converted into the page description language, the routine proceeds to step S6. In step S6, the document data is converted into the page description language format.

On the other hand, if it is determined, in step S5, that the document data is not to be converted into the page description language format, the routine proceeds to step S7. In step S7, it is determined whether or not the document data provided by the application 1a should be converted into a bit-map image format. If it is determined that the document data should be converted into the bit-map image format, the routine proceeds to step S8. In step S8, the document data is converted into the bit-map image format.

On the other hand, if it is determined, in step S7, that the document data should not be converted into the bit-map image format, the routine proceeds to step S9. In step S9, the document data is converted into a text format.

Figure 9:
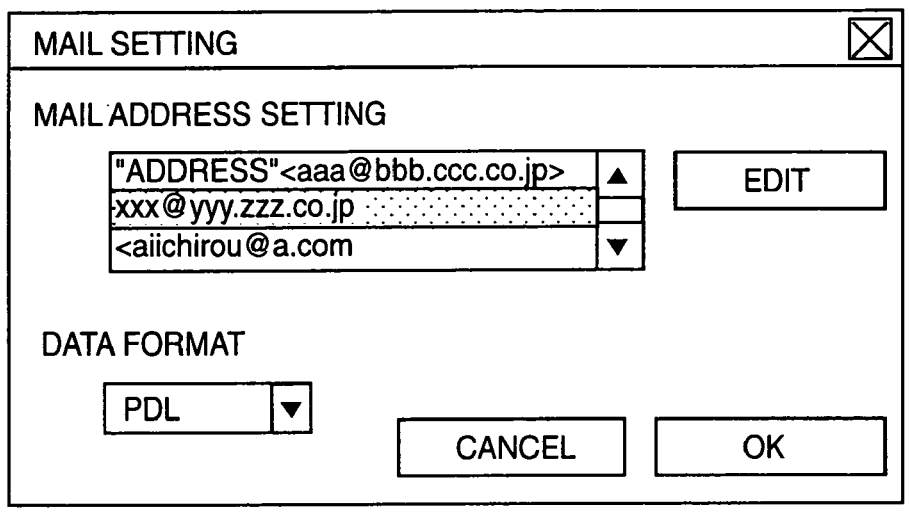
FIG. 9 is an illustration of a mail designating screen presented by the printer driver shown in FIG. 3.
Figure 10:
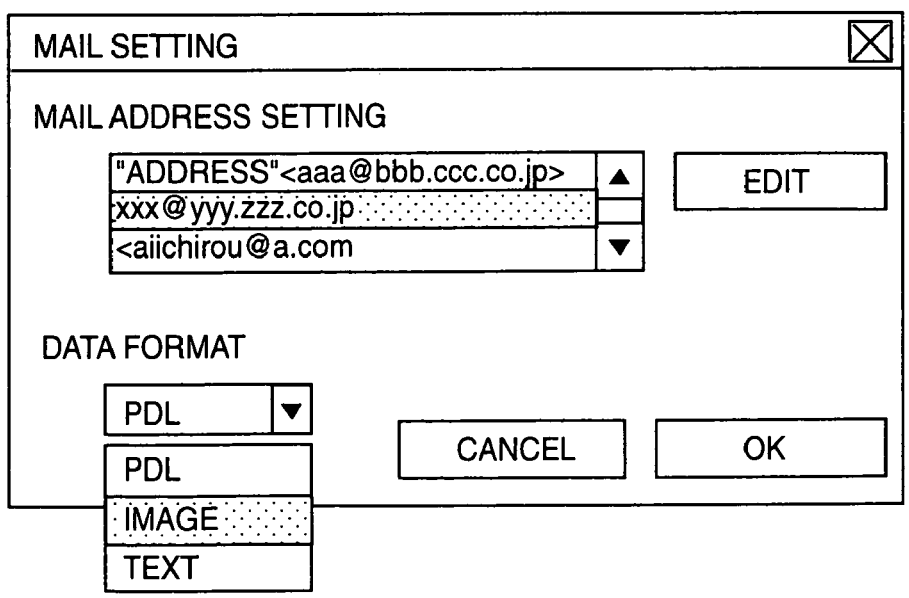
FIG. 10 is an illustration of the mail designating screen presented by the printer driver shown in FIG. 3.

The above-mentioned process for selecting the data format of the document data is performed by referring to a mail designating screen shown in FIG. 9. That is, in the screen shown in FIG. 8, when the user designates the mail transmission and clicks the OK button, the mail designating screen shown in FIG. 9 appears on the display unit of the PC 1. The user can designate a data format of the document data to be transmitted. The page description language (PDL) format is initially designated as a default format. Accordingly, if the user intends to designate the page description language format, there is no need to designate the PDL format on the screen. If the user intends to designate one of other data formats, the user clicks a transmission data format designating button on the screen so as to display selectable data formats. FIG. 10 shows the mail designating screen on which the selectable data formats are displayed. In this case, the PDL, the image and the text are displayed on the screen as selectable data formats. If the user selects and clicks the image, the bit-map image format is designated as the data format of the document data to be transmitted.

Returning to FIG. 6, when the process of step S6, step S8 or step S10 is completed, the routine proceeds to step S10. In step S10, a mail address to which the electronic mail is transmitted is obtained.

Figure 11:
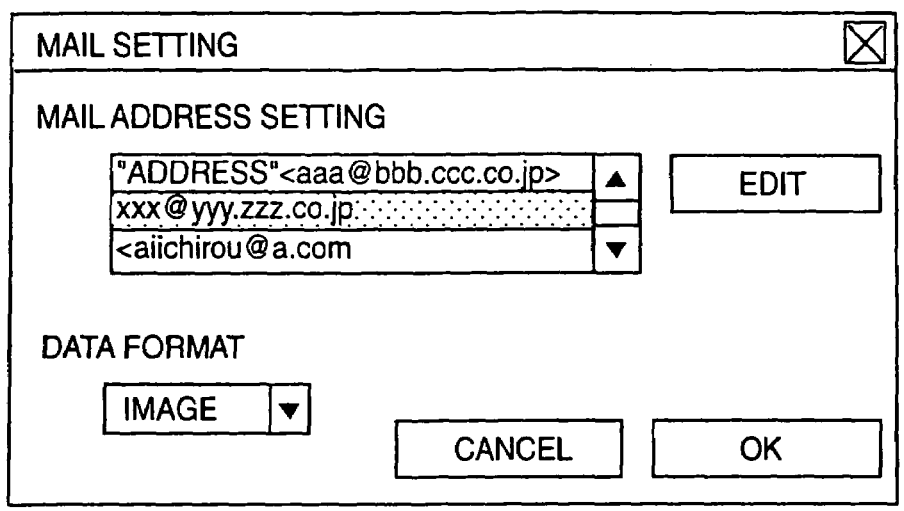
FIG. 11 is an illustration of the mail designating screen presented by the printer driver shown in FIG. 3.
Figure 12:
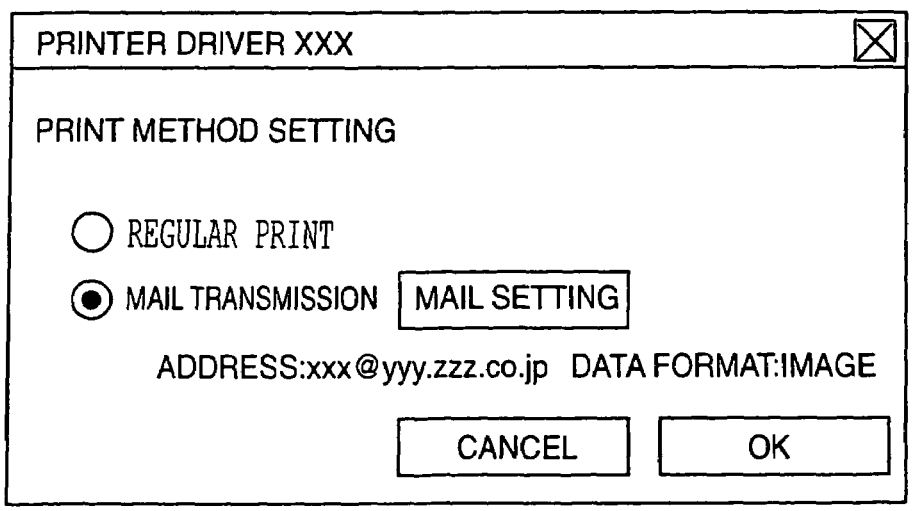
FIG. 12 is an illustration of the printing method designating screen presented by the printer driver shown in FIG. 3.

Specifically, the mail address to which the electronic mail is transmitted is set by the user designating one of mail addresses displayed on the mail designating screen shown in FIGS. 9, 10 and 11. Since the printer driver 1c is provided with the managing function for managing information regarding mail addresses, addition, deletion and edition of the registered mail addresses can be performed by clicking the edit button on the mail designating screen. When the user clicks the OK button after designating one of the data formats and designating one of the mail addresses on the mail designating screen, the user interface screen appears again. At this time, the designated mail address and the designated data format are displayed as shown in FIG. 12.

After the process of step S10 is completed, the converted document data is sent to a mail server as an electronic mail in step S11, and the operation of the printer driver 1c is ended.

It should be noted that the designation of the mail address by the process of step S10 may be performed before the designation and conversion of the data format by the process of steps S5 to S9.

Additionally, a designation as to whether the converted document data should be transmitted as a text of an electronic mail or as an attachment file attached to the electronic mail may be performed in the process of the printer driver 1c.

The present invention is not limited to the specifically disclosed embodiments, and variations and modifications may be made without departing from the scope of the present invention.

What is claimed is:

1. An electronic mail transmitting apparatus for transmitting document data via electronic mail, said electronic mail transmitting apparatus comprising:
    an application program for producing document data, said application program having a function to send a print instruction to print the document data; and
    a printer driver activated by the print instruction of said application program, said printer driver having a function to convert the document data provided by said application program into a data format processible by an application program of an electronic mail receiver and a function to transmit the converted document data via electronic mail;
    wherein the printer driver is capable of selecting the data format suitable for the electronic mail transmission from among a plurality of data formats other than page description language (PDL) format.

2. The electronic mail transmitting apparatus as claimed in claim 1, wherein said printer driver transmits the converted document data by attaching to an electronic mail as an attachment file.

3. The electronic mail transmitting apparatus as claimed in claim 1, wherein said predetermined data format is a bit-map image format.

4. The electronic mail transmitting apparatus as claimed in claim 1, wherein said predetermined data format is a document reader software format.

5. The electronic mail transmitting apparatus as claimed in claim 1, wherein said predetermined data format is a text format.

6. The electronic mail transmitting apparatus as claimed in claim 1, wherein said predetermined data format is one of a hyper text markup language (HTML) format and a standard generalized markup language (SGML) format.

7. The electronic mail transmitting apparatus as claimed in claim 1, wherein said printer driver has a function to manage information regarding electronic mail addresses.

8. The electronic mail transmitting apparatus as claimed in claim 1, wherein said printer driver has a function to edit a text of an electronic mail to be transmitted.

9. A method for transmitting document data prepared by an application program via electronic mail, the method comprising the steps of:
    transferring the document data to a printer driver by sending from said application program a print instruction for printing the document data;
    selecting a data format processible by an application program of an electronic mail receiver and suitable for electronic mail transmission from among a plurality of data formats other than a page description language data format;
    converting the document data into a predetermined data format by said printer driver; and
    transmitting the converted document data via electronic mail by an electronic mail transmitting function of said printer driver.

10. A processor readable medium storing program code for causing a computer to perform a function of a printer driver, comprising:
    first program code means for designating document data to be transmitted via electronic mail, the document data being provided to said printer driver in accordance with a print instruction;
    second program code means for converting the document data into a predetermined data format; and
    third program code means for transmitting the converted document data via electronic mail using said printer driver;
    wherein said second program code means includes program code means for selecting a data format processible by an application program of an electronic mail receiver and suitable for electronic mail transmission from among a plurality of data formats other than a page description language data format.

11. The processor readable medium as claimed in claim 10, wherein said third program code means includes program code means for inputting an electronic mail address of a remote party to which the document data is sent via electronic mail.

12. The electronic mail transmitting apparatus as claimed in claim 1, wherein said printer driver includes means for determining the predetermined data format suitable for the electronic mail transmission being performed.

13. The electronic mail transmitting apparatus as claimed in claim 1, wherein the application program is configured to allow selection of the data format into which the document data is converted.

14. The method for transmitting document data as claimed in claim 9, further comprising the step of selecting the predetermined data format into which the document data is converted using the application program.

15. The processor readable medium as claimed in claim 10, further comprising fourth program code means for selecting the data format into which the document data is converted using the first program code means.

* * * * *